(12) United States Patent
Sasaki et al.

(10) Patent No.: US 6,829,026 B2
(45) Date of Patent: *Dec. 7, 2004

(54) LAMINATED PHASE RETARDER HAVING A CHOLESTERIC LIQUID CRYSTAL LAYER, POLARIZING MEMBER AND LIQUID CRYSTAL DISPLAY DEVICE

(75) Inventors: Shinichi Sasaki, Ibaraki (JP); Takashi Yamaoka, Ibaraki (JP); Nao Murakami, Ibaraki (JP); Hiroyuki Yoshimi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/265,142

(22) Filed: Oct. 7, 2002

(65) Prior Publication Data

US 2003/0086033 A1 May 8, 2003

(30) Foreign Application Priority Data

Oct. 10, 2001 (JP) .................................... P2001-312161

(51) Int. Cl.⁷ ............................................. G02F 1/1335
(52) U.S. Cl. ...................................... 349/118; 349/119
(58) Field of Search ................................ 349/117–121

(56) References Cited

U.S. PATENT DOCUMENTS

| 5,241,408 A | * | 8/1993 | Ishikawa et al. .............. 349/76 |
| 5,543,948 A | * | 8/1996 | Takahashi et al. .......... 349/117 |
| 6,025,958 A | | 2/2000 | Yamaoka et al. |
| 6,407,787 B1 | * | 6/2002 | Sekime et al. .............. 349/119 |
| 6,531,195 B2 | * | 3/2003 | Negoro et al. ............... 428/1.2 |
| 2003/0103186 A1 | * | 6/2003 | Sasaki et al. ................ 349/194 |

FOREIGN PATENT DOCUMENTS

| JP | 3-9325 | 1/1991 |
| JP | 3-67219 | 3/1991 |
| JP | 3-140921 | 6/1991 |
| JP | 5-61039 | 3/1993 |
| JP | 6-186534 | 7/1994 |
| JP | 9-133810 | 5/1997 |

* cited by examiner

Primary Examiner—Tarifur R. Chowdhury
Assistant Examiner—Andrew Schechter
(74) Attorney, Agent, or Firm—Sughrue Mion, PLLC

(57) ABSTRACT

A laminated phase retarder having: a laminate of a retardation layer A made of a thermoplastic resin exhibiting positive birefringent characteristic and a retardation layer B constituted by an oriented solidified layer of cholesteric liquid crystal exhibiting a selective reflection wavelength range not larger than 350 nm; wherein Re of the laminate is not smaller than 10 nm and Rth−Re of the laminate is not smaller than 50 nm when Re and Rth are given by Re=(nx−ny)×d and Rth=(nx−nz)×d in which nx and ny are in-plane main refractive indices, nz is a thicknesswise refractive index, and $\underline{d}$ is a layer thickness. A polarizing member having: a laminate of a laminated phase retarder defined above; and a polarizer. A liquid-crystal display device having: a liquid-crystal cell; and a laminated phase retarder or a polarizing member defined above and disposed on at least one of opposite surfaces of the liquid-crystal cell.

5 Claims, 1 Drawing Sheet

Figure 1:
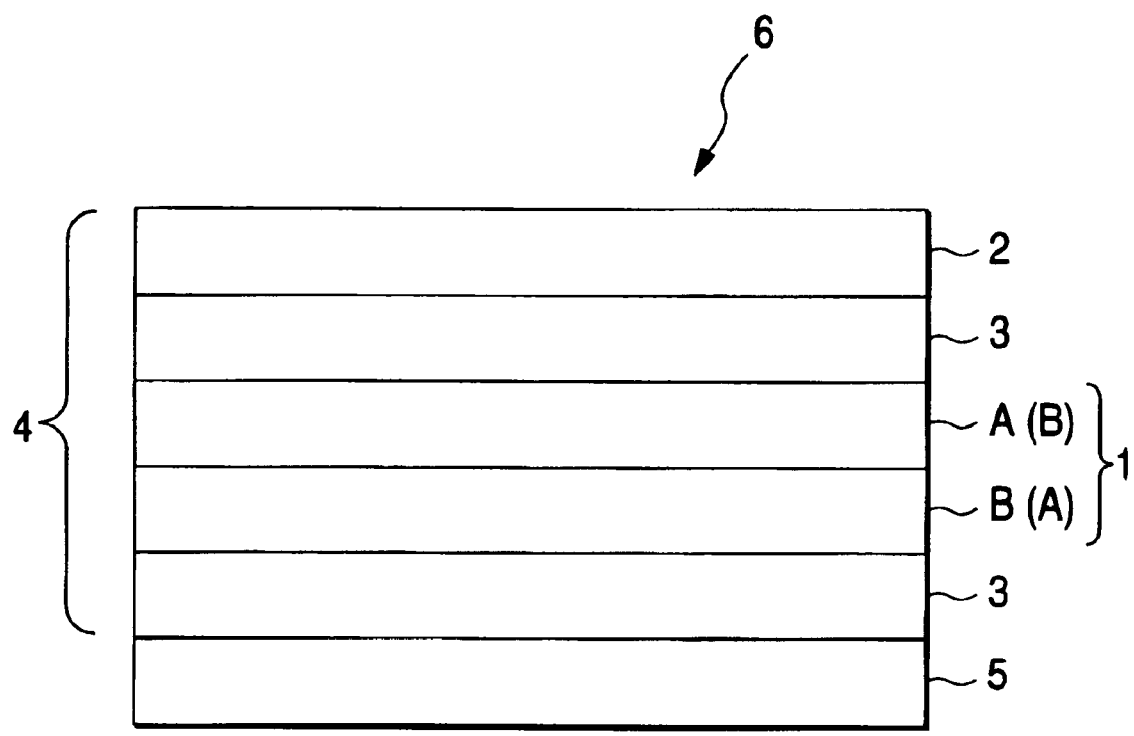

LAMINATED PHASE RETARDER HAVING A CHOLESTERIC LIQUID CRRYSTAL LAYER, POLARIZING MEMBER AND LIQUID CRYSTAL DISPLAY DEVICE

The present application is based on Japanese Patent Application No. 2001-312161, which is incorporated herein by reference.

BACKGROUND OF THE INVENTION

1. Field of the Invention

The present invention relates to a laminated phase retarder adapted for improvement in viewing angle characteristic of a liquid-crystal display device such as a vertical alignment (VA) type liquid-crystal display.

2. Description of the Related Art

A phase retarder having main refractive indices nx, ny and nz controlled in three directions including two in-plane directions $\underline{x}$ and $\underline{y}$ concerning oblique viewing directions, and one normal direction $\underline{z}$ is required for forming a liquid-crystal display device exhibiting excellent display quality in all azimuths while compensating for birefringence of a liquid-crystal cell. Particularly a phase retarder having three-direction main refractive indices satisfying the relation nx>ny>nz is required for forming a VA type or OCB type liquid-crystal display device.

As the phase retarder having main refractive indices nx, ny and nz controlled, two types of phase retarders have been heretofore known. The first type phase retarder is a laminated phase retarder formed from uniaxially stretched films which are laminated on each other so that directions of in-plane slow axes of the uniaxially stretched films intersect each other perpendicularly. The second type phase retarder is a monolayered phase retarder formed from a polymer film laterally or biaxially stretched by a tenter.

The former laminated phase retarder, however, has a problem that the laminated phase retarder can be hardly mass-produced because films high in thickness accuracy are required as well as the laminated phase retarder is bulky due to lamination of two films. On the other hand, in the latter monolayered phase retarder, the range of the retardation value obtained is narrow. When the retardation value in a thicknesswise direction is remarkably larger than that in a normal direction, at least two monolayered phase retarders must be laminated in the same manner as in the laminated phase retarder in order to obtain a required retardation value. The problem of bulk still occurs. Moreover, there is also a problem that the producing process is complicated because it is difficult to produce the phase retarder consecutively.

SUMMARY OF THE INVENTION

An object of the invention is to provide a phase retarder which is thin and excellent in manufacturability and which can be used for forming a liquid-crystal display device such as a VA type liquid-crystal display device improved in view angle characteristic to obtain high contrast.

According to the invention, there is provided a laminated phase retarder having: a laminate of a retardation layer A made of a thermoplastic resin exhibiting positive birefringent characteristic and a retardation layer B constituted by an oriented solidified layer of cholesteric liquid crystal exhibiting a selective reflection wavelength range not larger than 350 nm; wherein Re of the laminate is not smaller than 10 nm and Rth−Re of the laminate is not smaller than 50 nm on the basis of light with a wavelength of 590 nm when Re and Rth are given by Re=(nx−ny)×d and Rth=(nx−nz)×d in which nx and ny are in-plane main refractive indices, nz is a thicknesswise refractive index, and $\underline{d}$ is a layer thickness. There is also provided a polarizing member having: a laminate of a laminated phase retarder defined above; and a polarizer. There is further provided a liquid-crystal display device having: a liquid-crystal cell; and a laminated phase retarder or a polarizing member defined above and disposed on at least one of opposite surfaces of the liquid-crystal cell.

According to the invention, a material such as liquid crystal for forming a retardation layer can be formed with good production efficiency by a coating method without necessity of lamination of films, so that a high-quality laminated phase retarder excellent in reduction of thickness can be obtained with good manufacturability. The laminated phase retarder can be used for improving the viewing angle of a liquid-crystal cell greatly.

Features and advantages of the invention will be evident from the following detailed description of the preferred embodiments described in conjunction with the attached drawings.

DETAILED DESCRIPTION OF THE PREFERRED EMBODIMENTS

As shown in FIG. 1, the laminated phase retarder 1 according to the invention has a laminate of a retardation layer A (first retardation layer) made of a thermoplastic resin exhibiting positive birefringent characteristic and a retardation layer B (second retardation layer) constituted by an oriented solidified layer of cholesteric liquid crystal exhibiting a selective reflection wavelength range not larger than 350 nm; wherein Re of the laminate is not smaller than 10 nm and Rth−Re of the laminate is not smaller than 50 nm on the basis of light with a wavelength of 590 nm when Re and Rth are given by Re=(nx−ny)×d and Rth=(nx−nz)×d in which nx and ny are in-plane main refractive indices, nz is a thicknesswise refractive index, and $\underline{d}$ is a layer thickness. nx is an in-plane refractive index in the direction in which the in-plane refractive index becomes maximum within the plane of the plate, and ny is an in-plane refractive index in the direction orthogonal to the direction of nx.

The retardation layer A is formed from a thermoplastic resin exhibiting positive birefringent characteristic. That is, the retardation layer A is formed from a thermoplastic resin which exhibits characteristic of na>nb in which na is a refractive index in a direction of stretching of the film, and nb is a refractive index in a direction perpendicular to the stretching direction in a plane when the film of the resin is stretched uniaxially.

The thermoplastic resin is not particularly limited. A suitable transparent resin exhibiting positive birefringent characteristic can be used as the thermoplastic resin. Examples of the thermoplastic resin include polycarbonate, polyallylate, polysulfone, polyolefin, polyethylene terephthalate, polyethylene naphthalate, norbornene-based polymer, cellulose-based polymer, and mixture polymer constituted by at least two kinds of polymers selected from the polymers described above. Particularly, a resin excellent in controllability over birefringent characteristic, transparency and heat resistance is preferably used as the thermoplastic resin.

A film of the thermoplastic resin produced by a suitable method such as an extrusion molding method or a cast film-forming method is stretched by a suitable method such as a longitudinally stretching method using rolls or a laterally or biaxially stretching method using a tenter. In this manner, the retardation layer A can be formed. The temperature required for stretching is preferably set to be near the glass transition temperature (Tg) of the film as a subject of processing, particularly not lower than Tg and lower than the melting point of the film.

In the longitudinally stretching method using rolls, a suitable heating method such as a method using heating rolls, a method of heating an atmosphere or a method using the two methods in combination can be used. In the biaxially stretching method using a tenter, a suitable method such as a simultaneously biaxially stretching method using an entirely tentering method or a successively biaxially stretching method using a roll tentering method can be used.

A layer little in variations in orientation and retardation is preferably used as the retardation layer A. The thickness of the retardation layer A can be determined suitably in accordance with the retardation. Generally, the thickness of the retardation layer A is set to be in a range of from 1 to 300 $\mu$m, particularly in a range of from 10 to 200 $\mu$m, more particularly in a range of from 20 to 150 $\mu$m, from the point of view of reduction in thickness.

The retardation layer B is formed as a solidified layer obtained by orienting cholesteric liquid crystal having a selective reflection wavelength range not larger than 350 nm and by fixing the oriented state. Also the thickness of the retardation layer B can be determined suitably in accordance with the retardation. Generally, the thickness of the retardation layer B is set to be not larger than 20 $\mu$m, particularly in a range of from 0.1 to 15 $\mu$m, more particularly in a range of from 0.5 to 10 $\mu$m, from the point of view of reduction in thickness.

The cholesteric liquid crystal having a selective reflection wavelength range not larger than 350 nm is used not for selectively reflecting light in a visible region but for transmitting the light in the visible region to thereby achieve bright display. That is, assuming now that the wavelength nc-P of light incident in parallel with a helical axis is regarded as a center wavelength when nc is the average refractive index of the cholesteric liquid crystal and P is the helical pitch of the cholesteric liquid crystal on the basis of the helically oriented state of the cholesteric liquid crystal, then the cholesteric liquid crystal exhibits characteristic in which part of light with wavelengths near the center wavelength nc P is selectively reflected as one of left- and right-hand circularly polarized light beams. Hence, if the selectively reflected light region appears in a visible region, light allowed to be used for display is reduced disadvantageously. Therefore, the cholesteric liquid crystal is used for preventing this disadvantage.

A suitable material exhibiting the selective reflection characteristic, for example, as disclosed in Unexamined Japanese Patent Publications Hei, 3-67219, 3-140921, 5-61039, 6-186534, 9-133810, etc. can be used as the cholesteric liquid crystal. The material preferably used from the point of view of stability of the oriented solidified layer is a material, such as a cholesteric liquid-crystal polymer, a chiral agent-containing nematic liquid-crystal polymer or a compound forming such a liquid-crystal polymer by polymerization using light or heat, which can be used for forming a cholesteric liquid-crystal layer.

For example, the retardation layer B can be formed by a method of coating a transparent support base material with cholesteric liquid crystal. In this case, a method of recoating the base material with one kind of cholesteric liquid crystal or different kinds of cholesteric liquid crystal may be used in accordance with necessity for the purpose of controlling the retardation. A suitable method such as a gravure coating method, a die coating method or a dip coating method can be used in the coating process. A method in which a coating solution layer or a coating film provided on the support base material is transferred and bonded onto the retardation layer A through an adhesive layer may be used in accordance with necessity when the laminated phase retarder is formed.

A suitable material such as a film of a polymer can be used as the support base material. The laminated phase retarder may be integrated with the support base material or may be provided in a state in which the laminated phase retarder has no support base material. When the laminated phase retarder is integrated with the support base material, a material having birefringence as small as possible, such as a triacetylcellulose film, is preferably used as the support base material. Incidentally, for example, the laminated phase retarder having no support base material can be obtained by a method in which the support base material is separated through a releasant-treated surface of the support base material after the retardation layer B is formed on the releasant-treated surface of the support base material.

A method for orienting liquid crystal is used when the retardation layer B is formed in this state. The orienting method is not particularly limited. Any suitable method can be used if a liquid-crystal compound can be oriented by the method. An example of the orienting method is a method in which an oriented film constituted by a rubbed film of an organic compound such as a polymer, an obliquely vapor-deposited film of an inorganic compound, a film having micro-grooves or an accumulated Langmuir-Blodgett (LB) film of an organic compound such as $\omega$-tricosane, dioctadecylmethylammonium chloride or methyl stearate by a Langmuir-Blodgett method is provided and in which the oriented film is coated with liquid crystal to orient the liquid crystal.

Examples of the orienting method further include a method of coating a stretched film with liquid crystal to orient the liquid crystal (Unexamined Japanese Patent Publication No. Hei. 3-9325), a method of orienting liquid crystal under application of an electric field or a magnetic field, and a method using an oriented film having an orienting function generated by light irradiation. A system also used as the retardation layer can be employed in the stretched film or the rubbed film, so that a surface of the retardation layer A for forming the laminated phase retarder is rubbed in accordance with necessity to thereby serve also as a support base material having an orienting function.

Hence, the retardation layer A can be formed so as to serve also as a support of the retardation layer B. In this case, the laminated phase retarder can be provided as a particularly thin plate. Incidentally, the state of orientation of liquid crystal is preferably as uniform as possible and the layer is preferably provided as a solidified layer in which the oriented state is fixed.

The laminated phase retarder can be formed by lamination of the retardation layers A and B. The sequence of lamination is not particularly limited. The laminated phase retarder to be formed is a laminate having Re of not smaller than 10 nm, particularly in a range of from 20 to 1,000 nm, more particularly in a range of from 25 to 500 nm and having Re−Rth of not smaller than 50 nm, particularly in a range of from 70 to 1,500 nm, more particularly in a range of from 100 to 800 nm on the basis of light with a wavelength of 590 nm when Re and Rth are given by the expressions $Re=(nx-ny) \times d$ and $Rth=(nx-nz) \times d$ in which nx and ny are in-plane main refractive indices (in directions of slow and fast axes), nz is a thicknesswise refractive index, and $\underline{d}$ is a layer thickness.

The laminated phase retarder exhibiting the retardation characteristic can be used for forming a liquid-crystal display device excellent in viewing angle and contrast on the basis of compensation for birefringence of various kinds of liquid-crystal cells such as a VA type liquid-crystal cell and an OCB type liquid-crystal cell. For example, the laminate exhibiting the retardation characteristic can be obtained by a method using a retardation layer A having Re of from 20 to 300 nm and Rth/Re of from 1.0 to 50 and a retardation layer B having Re of from 0 to 20 nm and Rth of from 30 to 500 nm.

The laminated phase retarder may be laminated on a polarizer 2 to thereby form a polarizing member 4 as a laminate of the laminated phase retarder and the polarizer so that the polarizing member is put into practical use. A suitable material according to the related art can be used as the polarizer without any particular limitation. An example of the material of the polarizer is a polarizing film obtained by stretching and orienting a film of a hydrophilic polymer such as polyvinyl alcohol, partially formalized polyvinyl alcohol or partially saponified ethylene-vinyl acetate copolymer after adsorbing iodine and/or a dichromatic substance made of dichromatic dye such as azo-based dye, anthraquinone-based dye or tetrazine-based dye onto the film of the hydrophilic polymer. The polarizer may contain one transparent protective layer of a transparent film provided on one or each of opposite surfaces of the polarizing film. In this case, the laminated phase retarder according to the invention may serve also as the transparent protective layer for the sake of reduction in thickness.

The retardation layer adjacent to the polarizer may be the retardation layer A or B. The laminated phase retarder and the polarizer may be provided separately, but the two may be preferably fixed to each other in order to prevent displacement of optical axes and prevent contamination with foreign matter such as dust. A suitable method such as a bonding method using a transparent adhesive layer can be used for the fixation and lamination. The adhesive agent is not particularly limited in kind. An adhesive agent neither requiring any high-temperature process for curing and drying in the bonding process and nor requiring any long-term curing and drying process is preferably used from the point of view of preventing optical characteristic of the constituent members from changing. From this point of view, a hydrophilic polymer-based adhesive agent or pressure sensitive adhesive layer 3 can be preferably used.

Incidentally, a transparent pressure sensitive adhesive agent using a suitable polymer such as acryl-based polymer, silicone-based polymer, polyester, polyurethane, polyether or synthetic rubber can be used for forming the pressure sensitive adhesive layer 3. Particularly, an acryl-based pressure sensitive adhesive agent is preferably used from the point of view of optical transparency, tacky adhesion strength and weather resistance.

Incidentally, the pressure sensitive adhesive layer 3 may be provided on one or each of opposite surfaces of the laminated phase retarder 1 or the polarizing member 4 in accordance with necessity so that the laminated phase retarder or the polarizing member can be bonded to a subject such as a liquid-crystal cell 5. When the pressure sensitive adhesive layer is exposed to the surface in this case, the pressure sensitive adhesive layer may be preferably temporarily covered with a separator to prevent the surface of the pressure sensitive adhesive layer from being contaminated until the pressure sensitive adhesive layer is put into practical use.

The polarizing member 4 may be formed to have a suitable functional layer such as a protective layer for various purposes such as water resistance as described above in the transparent protective layer or an anti-reflection layer or/and an anti-glare layer for purposes such as prevention of surface reflection, on one or each of opposite surfaces of the polarizing member. The anti-reflection layer can be formed suitably as a light-coherence film such as a coating layer of a fluorine-based polymer or a multi layered metal vapor-deposited film. The anti-glare layer can be formed, for example, as a resin coating layer containing fine particles or by a suitable method in which a finely roughened structure is given to a surface to diffuse surface-reflected light by a suitable method such as embossing, sandblasting or etching.

Incidentally, at least one kind of fine particles selected from inorganic fine particles having a mean particle size of from 0.5 to 20 $\mu$m and organic fine particles may be used as the fine particles. The inorganic fine particles may be electrically conductive and maybe formed from silica, calcium oxide, alumina, titania, zirconia, tin oxide, indium oxide, cadmium oxide, antimony oxide, or the like. The organic fine particles may be crosslinked or non-crosslinked and may be formed from a suitable polymer such as a polymethyl methacrylate or polyurethane. The adhesive or pressure sensitive adhesive layer may contain such fine particles so as to exhibit light-diffusing characteristic.

For example, the laminated phase retarder or the polarizing member according to the invention can be used for a suitable purpose of forming a liquid-crystal display device 6, and preferably used particularly for optical compensation for the liquid-crystal cell. The liquid-crystal display device can be formed when the laminated phase retarder or the polarizing member is disposed on one of each of opposite surfaces of a liquid-crystal cell. For the formation of the liquid-crystal display device, suitable optical components

EXAMPLE 1

A polyester film (PET) was stretched longitudinally through heating rolls to thereby obtain a retardation layer A having Re of 50 nm and Rth of 51 nm.

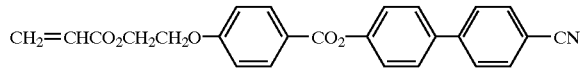

On the other hand, a nematic liquid-crystal compound represented by the formula and a chiral agent represented by a formula as follows were mixed with each other to form a mixture having a selective reflection wavelength of from 290 to 310 nm. A photo polymerization initiator was added into the mixture to prepare a cholesteric liquid-crystal solution. A biaxially stretched PET film was coated with the cholesteric liquid-crystal solution. After heated at 80° C. for 3 minutes, the cholesteric liquid-crystal solution was crosslinked by irradiation with ultraviolet rays. Thus, a retardation layer B having a thickness of 2.6 μm, Re of 0 nm and Rth of 198 nm was obtained. The retardation layer B was laminated on the retardation layer A through a 15 μm-thick acryl-based pressure sensitive adhesive layer. Then, the biaxially stretched PET film was released from the laminate. Thus, a laminated phase retarder was obtained by a consecutive producing process.

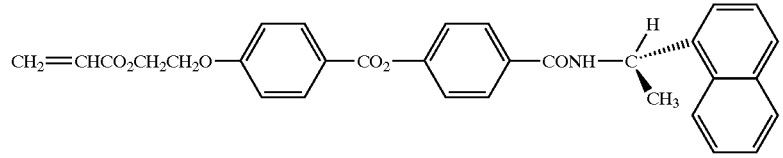

EXAMPLE 2

A laminated phase retarder was obtained in the same manner as in Example 1 except that a layer formed from a norborbene-based resin film stretched laterally by a tenter and having Re of 50 nm and Rth of 108 nm was used as the retardation layer A whereas a layer having a thickness of 2.0 μm, Re of 1 nm and Rth of 142 nm was used as the retardation layer B.

EXAMPLE 3

A triacetyl cellulose film was stretched laterally by a tenter to thereby obtain a retardation layer A having Re of 50 nm and Rth of 68 nm. A solution containing 1% by weight of polyvinyl alcohol was applied onto the retardation layer A and dried at 90° C. to thereby obtain a coating film about 0.01 μm thick. A surface of the coating film was rubbed to thereby form an oriented film. Then, the oriented film was coated with the same cholesteric liquid-crystal solution as used in Example 1. After heated at 90° C. for 1 minute, the cholesteric liquid-crystal solution was crosslinked by irradiation with ultraviolet rays. Thus, a retardation layer B having a thickness of 2.5 μm, Re of 0 nm and Rth of 185 nm was formed. In this manner, a laminated phase retarder was obtained by a consecutive producing process.

COMPARATIVE EXAMPLE

A 25 μm-thick acryl-based pressure sensitive adhesive layer was provided on a 77 μm-thick uniaxially stretched film made of a norbornene-based resin and having Re of 247 nm to thereby form a phase retarder. A piece punched out from the phase retarder and a piece punched out from a phase retarder constituted by a 83 μm-thick uniaxially stretched film made of a nonbornene-based resin and having Re of 199 nm were bonded to each other so that in-plane slow axes of the two phase retarders intersect each other perpendicularly. Thus, a laminated phase retarder was obtained.

EVALUATION TEST

Re and Rth of the laminated phase retarder obtained in each of Examples 1 to 3 and Comparative Example were measured with a measuring machine (KOBRA-21ADH made by Oji Scientific Instruments) using a parallel nicol rotary method as a principle. Results of the measurement were as shown in the following Table. Incidentally, the thickness of the laminated phase retarder was also shown in Table.

|  | Re (nm) | Rth (nm) | Thickness (μm) |
| --- | --- | --- | --- |
| Example 1 | 50 | 249 | 78 |
| Example 2 | 51 | 250 | 97 |
| Example 3 | 50 | 253 | 47 |
| Comparative Example | 48 | 247 | 185 |

It is obvious from Table that the thickness of the laminated phase retarder obtained in each of Examples can be reduced to about a half of the thickness of the laminated phase retarder obtained in Comparative Example when the laminated phase retarder having Re and Rth substantially equivalent to those in the laminated phase retarder obtained in Comparative Example is to be obtained. It is also obvious that the laminated phase retarder obtained in each of Examples can be produced by a consecutive producing process of from the step of forming phase retarders A and B to the step of laminating the phase retarders A and B. It is obvious from the description that a laminated phase retarder which exhibits retardation characteristic equivalent to that of the related-art laminated phase retarder and which can be used for forming a liquid-crystal display device of high-quality display thin, small and light-weight, excellent in productivity and excellent in visibility can be obtained according to the invention.

This invention should not be limited to the embodiments described above. Various modifications can be included in this invention within a range which can be easily realized by those skilled in the art without departing from the spirit of the scope of claim.

What is claimed is:

1. A laminated phase retarder, comprising:

a first retardation layer made of a thermoplastic resin exhibiting positive birefringent characteristic; and a second retardation layer constituted by an oriented solidified layer of cholesteric liquid crystal exhibiting a selective reflection wavelength range not larger than 350 nm, and laminated on said first retardation layer;

wherein Re of said laminated phase retarder is not smaller than 10 nm and Rth−Re of said laminated phase retarder is not smaller than 50 nm on the basis of light with a wavelength of 590 nm when Re and Rth are given by $Re=(nx-ny) \times d$ and $Rth=(nx-nz) \times d$ in which $nx$ and $ny$ are in-plane main refractive indices, $nz$ is a thicknesswise refractive index, and $d$ is a layer thickness, wherein: Re of said first retardation layer is in a range of from 20 to 300 nm and Rth/Rc of said first retardation layer is not smaller than 1.0, and Re of said second retardation layer is in a range of from 0 to 20 nm and Rth of said second retardation layer is in a range of from 30 to 500 nm.

2. A laminated phase retarder according to claim 1, further comprising a pressure sensitive adhesive layer provided on at least one of opposite surfaces of said laminated phase retarder.

3. A polarizing member comprising:

a laminated phase retarder according to claim 1, and a polarizer laminated on said laminated phase retarder.

4. A liquid-crystal display device comprising:

a liquid-crystal cell; and a polarizing member according to claim 4 and disposed on at least one of opposite surfaces of said liquid-crystal cell.

5. A liquid-crystal display device comprising:

a liquid-crystal cell; and a laminated phase retarder according to claim 1 and disposed on at least one of opposite surfaces of said liquid-crystal cell.

* * * * *

UNITED STATES PATENT AND TRADEMARK OFFICE
CERTIFICATE OF CORRECTION

PATENT NO.    : 6,829,026 B2  
DATED         : December 7, 2004  
INVENTOR(S)   : Shinichi Sasaki et al.

Page 1 of 1

It is certified that error appears in the above-identified patent and that said Letters Patent is hereby corrected as shown below:

Column 10,
Line 2, replace "Rth/Rc" with -- Rth/Re --.

Signed and Sealed this

Twenty-fourth Day of May, 2005

JON W. DUDAS
*Director of the United States Patent and Trademark Office*